United States Patent
Zheng et al.

(10) Patent No.: US 10,522,860 B2
(45) Date of Patent: Dec. 31, 2019

(54) SYSTEMS FOR HYBRID FUEL CELL POWER GENERATION

(71) Applicant: HONEYWELL INTERNATIONAL INC., Morristown, NJ (US)

(72) Inventors: Daguang Zheng, Torrance, CA (US); Dacong Weng, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 837 days.

(21) Appl. No.: 14/734,921

(22) Filed: Jun. 9, 2015

(65) Prior Publication Data

US 2016/0365590 A1    Dec. 15, 2016

(51) Int. Cl.
| | | |
|---|---|---|
| *H01M 8/0612* | (2016.01) | |
| *H01M 8/04111* | (2016.01) | |
| *H01M 8/06* | (2016.01) | |
| *H01M 8/0606* | (2016.01) | |
| *H01M 8/04007* | (2016.01) | |

(Continued)

(52) U.S. Cl.
CPC .......... *H01M 8/0618* (2013.01); *C01B 3/384* (2013.01); *C01B 3/48* (2013.01); *F01D 15/10* (2013.01); *H01M 8/04007* (2013.01); *H01M 8/04089* (2013.01); *H01M 8/04111* (2013.01); *H01M 8/04225* (2016.02); *H01M 8/06* (2013.01); *H01M 8/0606* (2013.01); *H01M 8/0612* (2013.01); *H01M 8/0662* (2013.01); *C01B 2203/0233* (2013.01); *C01B 2203/0495* (2013.01); *C01B 2203/066* (2013.01); *C01B 2203/0811* (2013.01); *C01B 2203/0894* (2013.01); *C01B 2203/169* (2013.01);

(Continued)

(58) Field of Classification Search
CPC .......... H01M 8/04753; H01M 8/0662; H01M 8/04111; H01M 8/06–8/0618; Y02T 90/42; Y02T 10/32; C01B 2203/1685
USPC .......................................................... 429/425
See application file for complete search history.

(56) References Cited

U.S. PATENT DOCUMENTS

| | | | |
|---|---|---|---|
| 5,139,894 A | * | 8/1992 | Mizuno ................... H01M 2/36 429/414 |
| 6,365,290 B1 | | 4/2002 | Ghezel-Ayagh et al. |

(Continued)

FOREIGN PATENT DOCUMENTS

FR    2904476 A1    2/2008

OTHER PUBLICATIONS

Extended EP Search Report for Application No. 16172332.5-1373 dated Oct. 20, 2016.

*Primary Examiner* — Nicholas P D'Aniello
*Assistant Examiner* — Abibatu O Ojo-Amoo
(74) *Attorney, Agent, or Firm* — Lorenz & Kopf, LLP (57) ABSTRACT

Apparatus are provided for a hybrid fuel cell system. The hybrid fuel cell system includes a fuel supply system. The fuel supply system includes a fuel source, a reforming subsystem and a depressurization system. The fuel source is in fluid communication with the reforming subsystem. The reforming subsystem reforms the fuel from the fuel source to generate hydrogen enriched gases, and the reforming subsystem is in fluid communication with the depressurization system. The depressurization system reduces a pressure of the hydrogen enriched gases. The hybrid fuel cell system also includes a fuel cell stack in communication with the depressurization system to receive the hydrogen enriched gases at the reduced pressure.

14 Claims, 3 Drawing Sheets

(51) Int. Cl.
*H01M 8/04225* (2016.01)
*F01D 15/10* (2006.01)
*H01M 8/0662* (2016.01)
*C01B 3/38* (2006.01)
*C01B 3/48* (2006.01)
*H01M 8/04089* (2016.01)
*H01M 8/04746* (2016.01)
*H01M 8/2457* (2016.01)

(52) U.S. Cl.
CPC . *C01B 2203/1685* (2013.01); *H01M 8/04753* (2013.01); *H01M 8/2457* (2016.02); *H01M 2250/20* (2013.01); *H01M 2250/402* (2013.01); *H01M 2250/407* (2013.01); *Y02B 90/12* (2013.01); *Y02E 60/563* (2013.01); *Y02T 10/32* (2013.01); *Y02T 90/32* (2013.01); *Y02T 90/42* (2013.01)

(56) References Cited

U.S. PATENT DOCUMENTS

| | | | |
|---|---|---|---|
| 6,868,677 B2 | 3/2005 | Viteri et al. | |
| 6,896,988 B2 | 5/2005 | Wang et al. | |
| 6,921,595 B2 | 7/2005 | Clawson et al. | |
| 7,150,143 B2 | 12/2006 | Schick et al. | |
| 7,184,875 B2 | 2/2007 | Ferrall et al. | |
| 7,272,934 B2 | 9/2007 | Chandran | |
| 7,553,568 B2 | 6/2009 | Keefer | |
| 7,563,527 B2 | 7/2009 | Tanaka et al. | |
| 7,595,124 B2 | 9/2009 | Varatharajan et al. | |
| 7,628,842 B2 | 12/2009 | Schwartz et al. | |
| 8,016,228 B2 | 9/2011 | Fucke et al. | |
| 8,450,022 B2 | 5/2013 | Stok et al. | |
| 8,616,294 B2 | 12/2013 | Zubrin et al. | |
| 2002/0004152 A1* | 1/2002 | Clawson | H01M 8/04022 429/412 |
| 2002/0081471 A1 | 6/2002 | Keegan et al. | |
| 2002/0162698 A1* | 11/2002 | Oglesby | B62D 33/0608 180/89.13 |
| 2004/0031388 A1 | 2/2004 | Hsu | |
| 2004/0150366 A1 | 8/2004 | Ferrall et al. | |
| 2006/0010866 A1 | 1/2006 | Rehg et al. | |
| 2006/0182680 A1 | 8/2006 | Keefer et al. | |
| 2010/0285381 A1* | 11/2010 | Biederman | H01M 8/04029 429/437 |
| 2014/0165569 A1 | 6/2014 | Hsu | |

* cited by examiner

SYSTEMS FOR HYBRID FUEL CELL POWER GENERATION

TECHNICAL FIELD

The present disclosure generally relates to systems for power generation, and more particularly relates to power generation using a hybrid fuel cell.

BACKGROUND

Generally, fuel cell systems employ a hydrogen-rich gas for power generation. Certain fuels, while rich in hydrogen, may also have heavy hydrocarbon compounds, such as diesel, jet fuel, etc. Fuels with heavy hydrocarbon compounds may require reforming to generate the hydrogen-rich gas for use by the fuel cell system. Certain methods for reforming can involve the use of a steam reformer, which can require an external heat transfer device to provide heat to the steam reformer. The use of an external heat transfer device, however, may add undesirable weight to the fuel cell system.

In addition, certain hybrid fuel cell systems require operation at a high pressure. In order to operate these hybrid fuel cell systems at a high pressure, a fuel cell stack associated with the fuel cell system requires a reinforced structure to maintain the high operating pressure. The use of the reinforced structure also adds undesirable weight to the fuel cell system.

Accordingly, it is desirable to provide improved systems for hybrid fuel cell power generation, which reduces system weight while maintaining efficient power generation. Furthermore, other desirable features and characteristics of the present invention will become apparent from the subsequent detailed description and the appended claims, taken in conjunction with the accompanying drawings and the foregoing technical field and background.

SUMMARY

According to various embodiments, a hybrid fuel cell system is provided. The hybrid fuel cell system includes a fuel supply system. The fuel supply system includes a fuel source, a reforming subsystem and a depressurization system. The fuel source is in fluid communication with the reforming subsystem. The reforming subsystem reforms the fuel from the fuel source to generate hydrogen enriched gases, and the reforming subsystem is in fluid communication with the depressurization system. The depressurization system reduces a pressure of the hydrogen enriched gases. The hybrid fuel cell system also includes a fuel cell stack in communication with the depressurization system to receive the hydrogen enriched gases at the reduced pressure.

A hybrid fuel cell system is provided, according to various embodiments. The hybrid fuel cell system includes a fuel supply system. The fuel supply system includes a fuel source, a start-up subsystem, a reforming subsystem and a depressurization system. The fuel source is in fluid communication with the start-up subsystem and the reforming subsystem. The start-up subsystem includes a steam generator that combusts the fuel from the fuel source and a source of water. The steam generator combusts the fuel to heat the water and generate steam. The reforming subsystem reforms the fuel from the fuel source with the steam to generate a hydrogen enriched gases and steam mixture. The depressurization system receives hydrogen enriched gases and reduces a pressure of the hydrogen enriched gases. The hybrid fuel cell system also includes a fuel cell stack downstream from and in communication with the depressurization system to receive the hydrogen enriched gases at the reduced pressure. The fuel cell stack is upstream from the steam generator.

Also provided according to various embodiments is a hybrid fuel cell system. The hybrid fuel cell system includes a source of a gas and a fuel supply system. The fuel supply system includes a fuel source, a start-up subsystem, a reforming subsystem and a depressurization system. The fuel source is in fluid communication with the start-up subsystem and the reforming subsystem. The start-up subsystem includes a steam generator that combusts the fuel from the fuel source and a source of water. The steam generator combusts the fuel to heat the water and generate steam. The reforming subsystem reforms the fuel from the fuel source with the steam to generate a hydrogen enriched gases and steam mixture. The depressurization system receives hydrogen enriched gases and reduces a pressure of the hydrogen enriched gases. The hybrid fuel cell system also includes a fuel cell stack downstream from and in communication with the depressurization system to receive the hydrogen enriched gases at the reduced pressure. The fuel cell stack is in communication with the gas supply system to receive the gas. The steam generator is downstream from the fuel cell stack to combust one or more exhaust gases from the fuel cell stack. The hybrid fuel cell system also includes a heat exchanger downstream from the steam generator and upstream from the fuel cell stack that receives an exhaust gas from the burner and heats the gas from the source of the gas before the gas flows into the fuel cell stack.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any power generation system that employs a hybrid fuel cell, and that the hybrid fuel cell system described herein is merely one exemplary embodiment according to the present disclosure. Moreover, while the hybrid fuel cell system is described herein as being used onboard a mobile platform, such as a bus, motorcycle, train, motor vehicle, marine vessel, aircraft, rotorcraft and the like, the various teachings of the present disclosure can be used with a stationary hybrid fuel cell system as well. Further, it should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
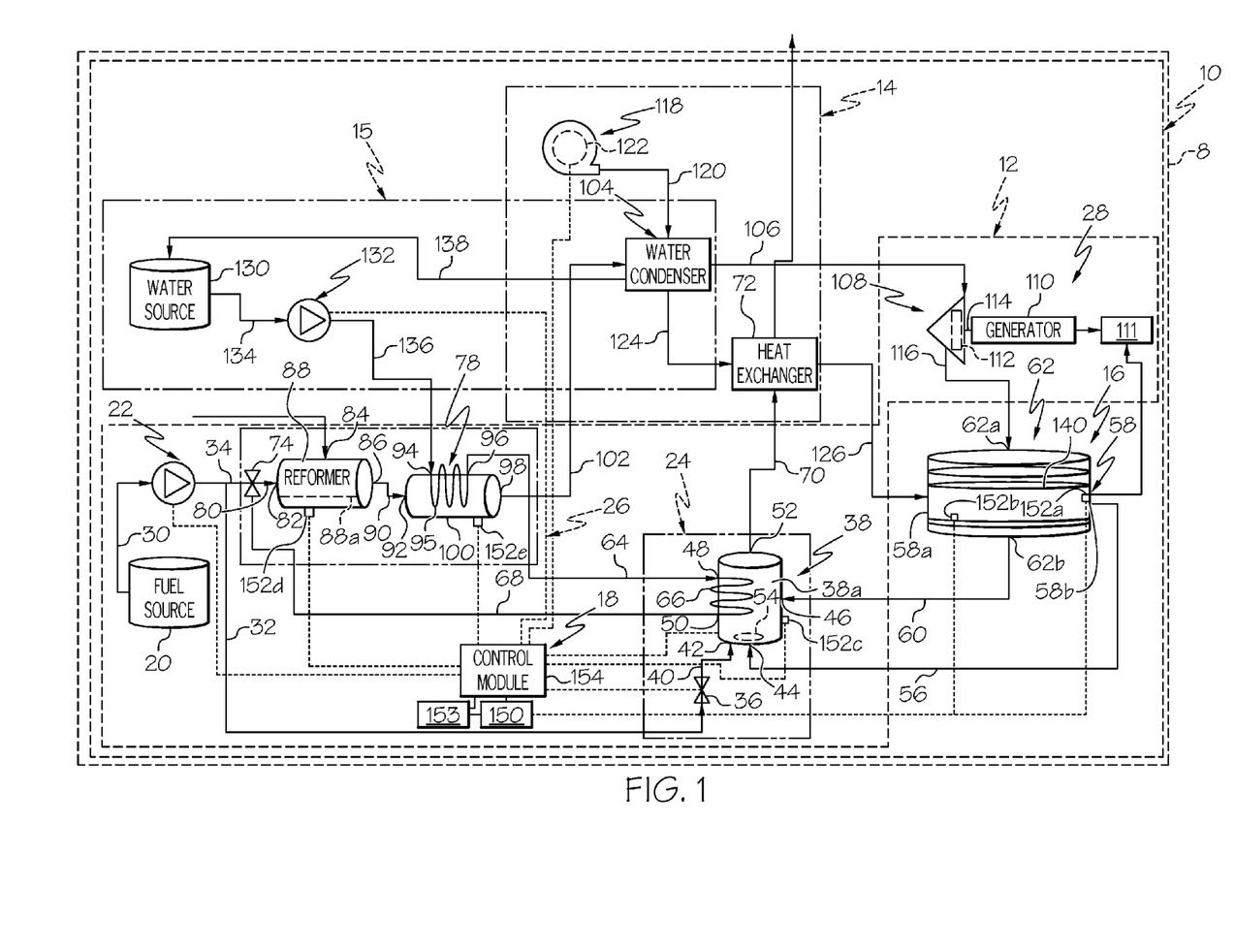
FIG. 1 is a schematic illustration of a hybrid fuel cell system in accordance with various embodiments.

With reference to FIG. 1, a hybrid fuel cell system 10 is shown. The hybrid fuel cell system 10 includes a fuel supply system 12, a gas supply system 14, a water supply system 15, a fuel cell stack 16 and a control system 18. The hybrid fuel cell system 10 can be part of a mobile platform 8, such as a bus, motorcycle, train, motor vehicle, marine vessel, aircraft, rotorcraft and the like. In the following example, the mobile platform 8 is described herein as being an aircraft, however, it will be appreciated that the present teachings of the present disclosure can be applied to any suitable mobile platform and/or a stationary hybrid fuel cell system. Although the fuel supply system 12, the gas supply system 14 and the fuel cell stack 16 are illustrated herein as being contained within or located onboard the mobile platform 8, it will be understood that one or more (or a portion) of the fuel supply system 12 and the gas supply system 14 can be located remote from the mobile platform 8, if desired. As will be discussed, the fuel supply system 12 does not require an external heat transfer device while having improved heat transfer efficiency, and thereby provides a hybrid fuel cell system 10 with reduced weight. Moreover, the hybrid fuel cell system 10 includes the fuel cell stack 16 operating at a low or ambient pressure, thereby further resulting in mass savings for the hybrid fuel cell system 10. In addition, while the figures shown herein depict an example with certain arrangements of elements, additional intervening elements, devices, features, or components may be present in an actual embodiment. It should also be understood that FIG. 1 is merely illustrative and may not be drawn to scale. Furthermore, while certain conduits are illustrated herein for enabling fluid communication between various components of the hybrid fuel cell system 10, it will be understood that the arrangement illustrated herein is merely exemplary. In this regard, any number of conduits and valves can be employed to provide fluid communication or fluid coupling between the various components of the hybrid fuel cell system 10 as known to one skilled in the art. Thus, the arrangement of conduits and valves contained herein is merely exemplary.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With continued reference to FIG. 1, the fuel supply system 12 is in fluid communication with the fuel cell stack 16 to provide the fuel cell stack 16 with a hydrogen-rich fuel supply or a supply of hydrogen enriched gases. In one example, the fuel supply system 12 includes a fuel source 20, a fuel pump 22, a start-up subsystem 24, a reforming subsystem 26 and a depressurization subsystem 28.

The fuel source 20 can comprise any suitable source of hydrogen containing fuel. In one example, the fuel source 20 can be disposed within the mobile platform 8, and can comprise a fuel tank, which can be fillable with a suitable hydrogen containing fuel. In the example of an aircraft, the fuel source 20 can comprise one or more of the wing mounted fuel tanks and/or a center mounted tank associated with the aircraft. The fuel contained in the fuel source 20 can comprise hydrogen, generally in the form of hydrocarbons. In one example, the fuel source 20 can comprise a source of jet fuel. In one example, the fuel source 20 can comprise a source of jet fuel. Exemplary jet fuels can comprise Jet A, Jet A-1 and Jet B. In order to optimize the performance of the fuel cell stack 16, fuel from the fuel source 20 is in communication with the reforming subsystem 26 to generate hydrogen-rich or hydrogen enriched gas from the fuel. Fuel from the fuel source 20 is also in fluid communication with the start-up subsystem 24 to provide the start-up subsystem 24 with fuel for initializing the hybrid fuel cell system 10 as will be discussed in greater detail herein.

The fuel pump 22 is in communication with the fuel source 20. While the fuel pump 22 is illustrated herein as being in communication with the fuel source 20 via a conduit 30, the fuel pump 22 can be disposed in the fuel source 20 (e.g. located within a fuel tank). The fuel pump 22 comprises any suitable fuel pump, including, but not limited to a diaphragm pump, a positive displacement pump, a piston metering pump, centrifugal pump, etc., as known to one skilled in the art. As the fuel pump 22 can be known to those skilled in the art, the fuel pump 22 will not be discussed in great detail herein. Briefly, the fuel pump 22 is operable to draw fuel from the fuel source 20 and deliver the fuel to the start-up subsystem 24 via conduit 32 and/or the reforming subsystem 26 via a conduit 34. It should be noted that while two conduits 32, 34 are illustrated herein, any arrangement of conduits and valves, including a single conduit with a three-way valve, for example. In one example, the fuel pump 22 is responsive to one or more control signals from the control system 18 to draw the fuel from the fuel source 20.

The start-up subsystem 24 receives fuel from the fuel source 20 via the fuel pump 22. The start-up subsystem 24 uses the fuel from the fuel source 20 to generate heat to bring the reforming subsystem 26 to a desired operating temperature. In one example, the start-up subsystem 24 comprises a start-up valve 36 and a steam generator or burner 38. The start-up valve 36 is coupled to the conduit 32 and is operable to permit or prevent the flow of fluid from the conduit 32 into the steam generator or burner 38. The start-up valve 36 can comprise any suitable valve capable of controlling a fluid flow as known to one skilled in the art. In one example, the start-up valve 36 comprises an electrically actuatable valve, which is responsive to one or more control signals from the control system 18 to move the start-up valve 36 between a first, opened position that enables fuel to flow to the steam generator or burner 38 and a second, closed position that prevents the flow of fuel into the steam generator or burner 38. The start-up valve 36 is illustrated herein as being coupled to the conduit 32 and a conduit 40, with the conduit 40 fluidly coupling the start-up valve 36 to the steam generator or burner 38; however, the start-up valve 36 can be coupled directly to an inlet port 42 of the steam generator or burner 38, if desired.

The steam generator or burner 38 includes the inlet port 42, an inlet port 44, an inlet port 46, a water inlet 48, a water outlet 50, an exhaust outlet 52 and a combustion source 54. The steam generator or burner 38 operates to combust fluids and/or gases received via the inlet ports 42, 44, 46 to generate heat to convert water received via the water inlet 48 into steam that exits the steam generator or burner 38 at the water outlet 50 and heated exhaust gas that exits the steam generator or burner 38 at the exhaust outlet 52. The steam generator or burner 38 can comprise any suitable fuel cell afterburner, combustor or catalytic combustor known to one skilled in the art. Generally, the steam generator or burner 38 operates at a low or an ambient pressure.

At the inlet port 42, the steam generator or burner 38 is fluidly coupled to the fuel pump 22 to receive fuel from the fuel source 20 when the start-up valve 36 is in the first, opened position. At the inlet port 44, the steam generator or burner 38 is fluidly coupled to the fuel cell stack 16 via a conduit 56 to receive exhaust gases associated with a cathode 58 of the fuel cell stack 16. Generally, the exhaust gases associated with the cathode 58 comprise air. At the inlet port 46, the steam generator or burner 38 is fluidly coupled to the fuel cell stack 16 via a conduit 60 to receive exhaust gases associated with an anode 62 of the fuel cell stack 16. Generally, the exhaust gases associated with the anode 62 comprise hydrogen depleted fuel gas.

At the water inlet 48, the steam generator or burner 38 receives water via a conduit 64. As will be discussed further herein, the conduit 64 is also fluidly coupled to the reforming subsystem 26 and to the water supply system 15 to provide water to the water inlet 48. In one example, a conduit 66 is in communication with the conduit 64. The conduit 66 continues through or passes through the steam generator or burner 38 such that the water within the conduit 66 is heated by the combustion occurring within the steam generator or burner 38 to convert the water into steam prior to the conduit 64 exiting the steam generator or burner 38 at the water outlet 50. At the water outlet 50, the water that has entered the steam generator or burner 38 at the water inlet 48 has been converted into high temperature steam. Thus, the conduit 66 enables heat transfer between the steam generator or burner 38 and the water within the conduit 66. The water outlet 50 is fluidly coupled to the conduit 66 and the reforming subsystem 26 via a conduit 68 to supply the reforming subsystem 26 with the high temperature steam. It should be noted that while three conduits 64, 66, 68 are described herein, the conduits 64, 66, 68 can comprise a single conduit and one or more valves that enable fluid communication between the reforming subsystem 26 and the steam generator or burner 38.

The exhaust outlet 52 is in fluid communication with a portion of the gas supply system 14, as will be discussed in greater detail herein. Briefly, the exhaust outlet 52 is in communication with a conduit 70 that receives hot exhaust gases generated by the combustion process within the steam generator or burner 38 and the conduit 70 carries these hot exhaust gases through a heat exchanger 72 associated with the gas supply system 14. As will be discussed, the heat exchanger 72 operates to transfer the heat from the exhaust gases to gas supplied by the gas supply system 14 to raise the temperature of the gas supply system 14 and thereby cool or reduce the temperature of the exhaust gas. Once the exhaust gases have passed through the heat exchanger 72, the exhaust gases are expelled or exhausted outside of the mobile platform 8.

The combustion source 54 can comprise any suitable source for igniting the fluid and/or gases received at the inlet ports 42, 44, 46. In one example, the combustion source 54 comprises a spark igniter, however, the combustion source 54 can comprise any suitable igniter known to one skilled in the art, including, but not limited to, the spark igniter, a hot surface type igniter and a catalytic combustor type igniter. In one example, as is generally known, the steam generator or burner 38 can comprise a combustion chamber 38a, through which the conduit 66 containing water can pass. The inlet ports 42, 44, 46 are in communication with the combustion chamber 38a to provide the combustion chamber 38a with the fluids and/or gases for combustion. The combustion source 54 can be disposed in the combustion chamber 38a to ignite the fuels and/or gases received from the inlet ports 42, 44, 46 to generate heat. As the conduit 66 passes through the combustion chamber 38a so as to be in proximity to the heat generated by the combustion process, the heat from the combustion process converts the water which enters the conduit 66 at the water inlet 48 into steam, which exits the combustion chamber 38a and the steam generator or burner 38 at the water outlet 50 and is directed via the conduit 68 to the reforming subsystem 26. Thus, the steam generator or burner 38 serves to generate steam, which can be used by the reforming subsystem 26.

The reforming subsystem 26 is fluidly coupled to the steam generator or burner 38 and the fuel pump 22. The reforming subsystem 26 reforms the fuel from the fuel source 20 (provided by the fuel pump 22) to generate a high pressure hydrogen-rich gas or hydrogen enriched gases for use by the fuel cell stack 16. In one example, the reforming subsystem 26 includes a mixing valve 74, a reformer 76 and a water-gas shift reactor 78. The mixing valve 74 is in fluid communication with the conduit 34 to receive fuel from the fuel source 20 and is in fluid communication with the conduit 68 to receive high temperature steam heated by the steam generator or burner 38. The mixing valve 74 comprises any suitable valve known to one skilled in the art that enables the mixing of the fuel with the high temperature steam. Generally, the mixing valve 74 combines the fuel from the conduit 34 with the high temperature steam from the conduit 68 at a desired fuel/steam ratio, and the mixture of fuel and high temperature steam flows out of the mixing valve 74 into a conduit 80.

The conduit 80 is in fluid communication with the reformer 76. In one example, the reformer 76 comprises any suitable steam reformer known to those skilled in the art. For example, the reformer 76 comprises a steam reformer catalyst. As the reformer 76 is generally known in the art, the reformer 76 will not be discussed in great detail herein. Briefly, however, the reformer 76 includes a reformer inlet 82, an optional air inlet 84, a reformer outlet 86 and a housing 88. The reformer inlet 82 is in fluid communication with the conduit 80 to receive the mixture of high temperature steam and fuel from the mixing valve 74. The air inlet 84 is in fluid communication with a source of air, such as ambient air within the mobile platform 8, or air external to the mobile platform 8. The reformer outlet 86 is in fluid communication with a conduit 90 to direct the product of the steam reformer to the water-gas shift reactor 78.

The reformer inlet 82, optional air inlet 84 and reformer outlet 86 are each coupled to and in fluid communication with the housing 88 of the reformer 76. The housing 88 generally contains a reactant or catalysts 88a that facilitate a reaction between the high temperature steam and fuel. The catalysts 88a can comprise a base metal catalyst, which can be contained in the housing 88. The catalysts 88a can be disposed in the housing 88 in any suitable fashion to facilitate the reaction between the high temperature steam and fuel, and in one example, the catalysts 88a can form a packed bed, over which the high temperature steam and fuel can flow. The reaction between the high temperature steam and fuel converts the fuel into hydrogen ($H_2$), carbon monoxide (CO) and carbon dioxide ($CO_2$), which flows with the steam from the reformer outlet 86 associated with the housing 88 via the conduit 90. Generally, the reformer 76 operates at a pressure that is higher than ambient pressure, such as about 1.0 barG to about 10.0 barG.

Table 1, below, illustrates a simulation of the reformation of jet fuel in the reformer 76.

TABLE 1

|  | steam inlet T (C.) | steam/ fuel ratio | Reactor T (C.) | CO2 % | H2O % | H2 % | CO % | dry based CO % |
|---|---|---|---|---|---|---|---|---|
| Fuel Content After Reformer | 900 | 2 | 564.42 | 8.15 | 6.93 | 65.67 | 19.08 | 20.51 |
|  | 900 | 3 | 642.64 | 10.72 | 19.16 | 58.21 | 11.77 | 14.56 |
|  | 900 | 4 | 689.40 | 10.84 | 29.44 | 51.29 | 8.32 | 11.79 |
|  | 900 | 5 | 722.10 | 10.38 | 37.61 | 45.61 | 6.30 | 10.10 |
|  | 900 | 6 | 745.73 | 9.80 | 44.14 | 41.00 | 4.97 | 8.90 |

In Table 1, the steam inlet temperature in degrees Celsius (C) is the temperature at the reformer inlet 82, and the reactor temperature is a temperature of the housing 88 of the reformer 76. The steam/fuel ratio is the ratio of steam to fuel as mixed by the mixing valve 74. The values of the percentage of carbon dioxide ($CO_2$), water ($H_2O$), hydrogen ($H_2$), carbon monoxide (CO) and dry based carbon monoxide (dry based CO) are determined after the jet fuel and steam mixture has passed through the reformer 76. In this simulation, the reformer 76 is operating at a pressure of 1 atmosphere (atm).

The conduit 90 is coupled to and in fluid communication with the water-gas shift reactor 78. The water-gas shift reactor 78 can comprise a suitable water-gas shift reactor catalyst, as known to one skilled in the art. Generally, the water-gas shift reactor 78 operates at a pressure that is higher than ambient pressure, such as about 1.0 barG to about 10.0 barG. As the water-gas shift reactor 78 is known to one skilled in the art, the water-gas shift reactor 78 will not be discussed in great detail herein.

Briefly, however, the water-gas shift reactor 78 includes a reactor inlet 92, a reactor water inlet 94, a reactor water outlet 96, a reactor outlet 98 and a housing 100. The reactor inlet 92, reactor water inlet 94, reactor water outlet 96 and the reactor outlet 98 are each coupled to and in fluid communication with the housing 100. In one example, the housing 100 of the water-gas shift reactor 78 includes a fixed bed reactor having catalysts that convert the carbon monoxide (CO) and steam received at the reactor inlet 92 from the conduit 90 into hydrogen ($H_2$) and carbon dioxide ($CO_2$), resulting in hydrogen enriched gases and steam at the reactor outlet 98.

The reactor inlet 92 is fluidly coupled to the conduit 90 to receive hydrogen ($H_2$), carbon monoxide (CO) and carbon dioxide ($CO_2$) gas, and steam from the reformer 76. The reactor water inlet 94 is in communication with the water supply system 15 to receive low temperature water from the water supply system 15 for circulation within the housing 100 via a conduit 95. The circulation of the low temperature water within the housing 100 from the reactor water inlet 94 to the reactor water outlet 96 via the conduit 95 can allow for slight heat transfer between the gas received from the reformer 76 and the water received from the water supply system 15. The water circulated through the housing 100 exits the housing 100 at the reactor water outlet 96, which is coupled to and in fluid communication with the conduit 64 to direct this water to the steam generator or burner 38. The reactor outlet 98 is coupled to and in fluid communication with a conduit 102, and the conduit 102 directs the resultant hydrogen enriched gases and steam from the water-gas shift reactor 78 to a water condenser 104 associated with the water supply system 15. As will be discussed in further detail below, the water condenser 104 removes or condenses the steam in the resultant hydrogen enriched gases and steam from the water-gas shift reactor 78 prior to the hydrogen enriched gases flowing into the depressurization subsystem 28. By removing the steam from the hydrogen enriched gases and steam mixture, the gas supplied to the depressurization subsystem 28 contains mostly hydrogen enriched gas at a high pressure.

Table 2, below, illustrates a simulation of the concentrations of carbon dioxide ($CO_2$), water ($H_2O$), hydrogen ($H_2$), carbon monoxide (CO) and dry based carbon monoxide (dry based CO) in the simulated jet fuel after the jet fuel and steam mixture from the conduit 90 flows through the water-gas shift reactor 78.

TABLE 2

|  | steam/fuel ratio | Reactor T (C.) | CO2 % | H2O % | H2 % | CO % | dry based CO % |
|---|---|---|---|---|---|---|---|
| Fuel Content After Water-Gas Shift Reactor | 5 | 250 | 16.23 | 31.76 | 51.46 | 0.45 | 0.66 |
|  | 5 | 200 | 16.46 | 31.53 | 51.69 | 0.22 | 0.32 |
|  | 5 | 160 | 16.59 | 31.40 | 51.81 | 0.09 | 0.14 |
|  | 5 | 150 | 16.62 | 31.37 | 51.85 | 0.06 | 0.09 |

In Table 2, the steam inlet temperature in degrees Celsius (C) is the temperature at the reactor inlet 92, and the reactor temperature is a temperature of the housing 100 of the water-gas shift reactor 78. The steam/fuel ratio is the ratio of steam to fuel as mixed by the mixing valve 74. The values of the percentage of carbon dioxide ($CO_2$), water ($H_2O$), hydrogen ($H_2$), carbon monoxide (CO) and dry based carbon monoxide (dry based CO) are determined after the reformate from the reformer 76 has passed through the water-gas shift reactor 78. In this simulation, the water-gas shift reactor 78 is operating at a pressure of 1 atmosphere (atm). Thus, as illustrated in Table 1 and Table 2, the use of the reformer 76 and the water-gas shift reactor 78 in series results in a hydrogen-rich fuel stream or hydrogen enriched gases, with reduced amounts of carbon monoxide (CO) and dry based carbon monoxide (dry based CO).

The depressurization subsystem 28 is fluidly coupled to the water condenser 104 and receives the hydrogen enriched gas from the water condenser 104 via conduit 106. In one example, the depressurization subsystem 28 includes a turbine 108 and a generator 110. The turbine 108 can be coupled to and in communication with the conduit 106 to receive the higher pressure hydrogen enriched gases from the water condenser 104. As the turbine 108 can comprise a conventional turbine known to one skilled in the art, the turbine 108 will not be discussed in great detail herein. Briefly, however, in one example, the turbine 108 includes at least one rotor assembly 112 disposed in a casing, and the rotor assembly 112 is coupled to a drive shaft 114. The high pressure hydrogen enriched gases from the conduit 106 enters the casing of the turbine 108 and impinges on the rotor assembly 112, causing the rotor assembly 112 to move or rotate. The movement or rotation of the rotor assembly 112 causes the rotation of the drive shaft 114, while also serving to depressurize or reduce the pressure of the hydrogen enriched gases. The depressurized or reduced pressure hydrogen enriched gases flow from the turbine 108 to the fuel cell stack 16 via a conduit 116. In one example, a pressure ratio of the turbine 108 ranges from about 45:1 to about 24:1.

The generator 110 is coupled to the drive shaft 114 of the turbine 108. The generator 110 can comprise any suitable device for converting the rotational mechanical energy of the drive shaft 114 into electrical energy. For example, the generator 110 can comprise an electric generator 110 as known to one skilled in the art. The electrical energy generated by the generator 110 can be transmitted to one or more consumers 111 onboard the mobile platform 8, if desired.

The gas supply system 14 supplies a gas to the cathode 58 of the fuel cell stack 16. In one example, the gas is air, however, the gas supply system 14 can comprise any suitable supply of gas for use with the fuel cell stack 16. The gas supply system 14 includes a blower 118 and the heat exchanger 72. The blower 118 draws gas in and creates a current of the gas or a gas stream, which is directed into a conduit 120. In one example, the blower 118 draws in gas from air contained within the mobile platform 8, and/or draws in air from the environment surrounding the mobile platform 8. For example, in the embodiment of an aircraft, the blower 118 can draw in air from the environment (ram air) or can draw in air from within a fuselage. The blower 118 can comprise any suitable conventional blower for creating and directing a current of air, as known to one skilled in the art. As the blower 118 can be known in the art, the blower 118 will not be discussed in great detail herein. Briefly, however, the blower 118 can include a motor 122, which can be responsive to one or more control signals from the control system 18 to draw in gas and create the gas stream.

The gas stream from the conduit 120 can flow through the water condenser 104. As will be discussed in further detail below, as the gas stream in the conduit 120 can comprise cool or low temperature gas, the flow of the gas through the water condenser 104 slightly cools the fluid in the conduit 102 from the water-gas shift reactor 78, which causes the steam in the fluid to condense into water. From the water condenser 104, the gas stream flows via a conduit 124 into the heat exchanger 72. The heat exchanger 72 transfers heat from the exhaust gas in the conduit 70 to the gas stream from the conduit 124 to heat the gas stream. As the heat exchanger 72 can comprise any suitable heat exchanger known in the art, the heat exchanger 72 will not be discussed in great detail herein. The heat exchanger 72 serves to warm the gas stream with the heat from the exhaust gas of the steam generator or burner 38 prior to the gas stream flowing into the cathode 58 of the fuel cell stack 16. A conduit 126 fluidly couples the heat exchanger 72 to the cathode 58 of the fuel cell stack 16 to deliver the heated gas stream to the fuel cell stack 16.

The water supply system 15 provides water for use by the steam generator or burner 38. The water supply system 15 includes a water source 130, a water pump 132 and the water condenser 104. The water source 130 comprises any suitable source of water and in one example, comprises a water tank. The water source 130 can be located onboard the mobile platform 8, or can be located remote from the mobile platform 8 and fluidly coupled to the mobile platform 8 through suitable piping and couplings. The water supplied by the water source 130 can be potable or non-potable.

The water pump 132 is fluidly coupled to the water source 130, and is operable to pressurize or move water from the water source 130 to the steam generator or burner 38. As the water pump 132 can comprise any suitable pump that moves or pressurizes a fluid as known to one skilled in the art, the water pump 132 will not be discussed in great detail herein. For example, the water pump 132 can comprise a rotary vane pump, a reciprocating pump, etc. Briefly, the water pump 132 is operable to draw water from the water source 130 via conduit 134 and deliver the water via conduit 136, with the water being heated by the water-gas shift reactor 78 before the water enters the steam generator or burner 38. It should be noted that while two conduits 134, 136 are illustrated herein, any arrangement of conduits and valves can be employed to enable the water pump 132 to deliver water from the water source 130 to the steam generator or burner 38. In one example, the water pump 132 is responsive to one or more control signals from the control system 18 to draw the water from the water source 130.

The water condenser 104 comprises any suitable water condenser 104 for condensing water, as known to one skilled in the art. Generally, the water condenser 104 is operated at a pressure greater than ambient pressure, such as about 1.0 barG to about 10.0 barG. The water condenser 104 receives the higher temperature hydrogen enriched gases and steam mixture from the conduit 102 and the lower temperature gas from the conduit 120. The heat differential between the hydrogen enriched gases and steam mixture from the conduit 102 and the lower temperature gas from the conduit 120 causes the steam in the hydrogen enriched gases and steam mixture to condense into water. The water condensed by the water condenser 104 is directed via a conduit 138 to the water source 130, thereby recycling at least a portion of the water supplied by the water supply system 15. The water condensed by the water condenser 104 can travel through the conduit 138 to the water source 130 via a gravity feed in one example; however, a second water pump can be employed if desired, to assist in moving the water from the water condenser 104 through the conduit 138. After passing through the water condenser 104, the hydrogen enriched gases, substantially depleted of steam, is directed to the turbine 108 via the conduit 106.

The fuel cell stack 16 is fluidly coupled to the turbine 108 to receive the lower pressure hydrogen-rich gas or lower pressure hydrogen enriched gases via the conduit 116, and is fluidly coupled to the heat exchanger 72 to receive the heated gas via the conduit 126. The fuel cell stack 16 is operated at a low or ambient pressure, thereby reducing the weight of the fuel cell stack 16 as compared to a fuel cell stack operating at a higher pressure. As the fuel cell stack 16 can comprise any suitable conventional fuel cell stack 16 known in the art, the fuel cell stack 16 will not be discussed in great detail herein. Briefly, in one example, the fuel cell stack 16 can comprise a proton exchange or polymer electrolyte membrane (PEM) fuel cell stack 16. It should be noted that the example of a PEM fuel cell stack 16 is merely exemplary, as the fuel cell stack 16 can comprise any suitable fuel cell stack 16, including, but not limited to, a solid oxide fuel cell stack. Generally, as is known in the art, in the example of a PEM fuel cell stack, the fuel cell stack 16 includes the cathode 58 and the anode 62, which are separated by an electrolyte, such as a polymer electrolyte membrane 140. The cathode 58 includes a cathode inlet 58a and a cathode outlet 58b. The cathode 58 is in fluid communication with the conduit 126 to receive the heated gas at the cathode inlet 58a. The anode 62 includes an anode inlet 62a and an anode outlet 62b. The anode inlet 62a is in fluid communication with the turbine 108 to receive the lower pressure hydrogen enriched gases via the conduit 116.

As known in the art, the polymer electrolyte membrane 140 facilitates an electrochemical reaction between oxygen in the gas received at the cathode inlet 58a and the hydrogen or hydrogen enriched gases received at the anode inlet 62a. The electrochemical reaction results in electrical energy, which can be conducted from the fuel cell stack 16 to the one or more consumers 111 located downstream from the fuel cell stack 16 through suitable transmission components as known to those skilled in the art. The cathode outlet 58b receives water and remaining air from the electrochemical reaction, and the anode outlet 62b receives the remaining hydrogen enriched gases from the electrochemical reaction. The cathode outlet 58b and the anode outlet 62b can be in fluid communication with the steam generator or burner 38 via conduits 56, 60 to ignite the exhaust gases from the fuel cell stack 16.

The control system 18 controls the operation of the hybrid fuel cell system 10. In one example, the control system 18 includes an input device 150, one or more sensors 152 and a control module 154. The input device 150 is manipulable by an operator of the hybrid fuel cell system 10 to generate user input. In various embodiments, the user input can include a command to start or stop the operation of the hybrid fuel cell system 10. The input device 150 can be implemented as a keyboard (not separately shown), a microphone (not separately shown), a touchscreen layer associated with or as part of a display 153, a switch, a button or other suitable device to receive data and/or commands from the user. Of course, multiple input devices 150 can also be utilized. The input device 150 can be in communication with the control module 154 over a suitable architecture or arrangement that facilitates the transfer of data, commands, power, etc.

The one or more sensors 152 measure and observe various conditions associated with the hybrid fuel cell system 10. It should be noted that the one or more sensors 152 described and illustrated herein are merely exemplary, as any number of sensors can be employed to measure and observe conditions associated with the hybrid fuel cell system 10. In one example, the one or more sensors 152 include a current sensor 152a, a first temperature sensor 152b, a second temperature sensor 152c, a third temperature sensor 152d, a fourth temperature sensor 152e. The current sensor 152a measures and observes a current output by the fuel cell stack 16 due to the electrochemical reaction, and generates sensor signals based thereon. The first temperature sensor 152b measures and observes a temperature of the fuel cell stack 16, and generates sensor signals based thereon. The second temperature sensor 152c measures and observes a temperature of the steam generator or burner 38, and generates sensor signals based thereon. The third temperature sensor 152d measures and observes a temperature of the reformer 76, and generates sensor signals based thereon. The fourth temperature sensor 152e measures and observes a temperature of the water-gas shift reactor 78, and generates sensor signals based thereon. The one or more sensors 152 are in communication with the control module 154 over a suitable architecture or arrangement that facilitates the transfer of data, commands, power, etc.

The control module 154 receives the user input from the user input device 150. Based on the user input, the control module 154 outputs one or more control signals to the start-up valve 36 to move the start-up valve 36 between the first, opened position and the second, closed position. Based on the user input, the control module 154 also outputs one or more control signals to the fuel pump 22 to activate or deactivate the fuel pump 22. The control module 154 also outputs the one or more control signals to the fuel pump 22 to control the operation of the fuel pump 22 (e.g. the flow rate of the fuel pump 22) based on the sensor signals. The control module 154 outputs one or more control signals to the combustion source 54 of the steam generator or burner 38 based on the user input. Based on the sensor signals, the control module 154 outputs one or more control signals to the mixing valve 74 to move the mixing valve 74 between the first, opened position and the second, closed position. Based on the sensor signals or the user input, the control module 154 outputs one or more control signals to the water pump 132 to activate or deactivate the water pump 132. Based on the sensor signals, the control module 154 outputs one or more control signals to the blower 118 to activate or deactivate the blower 118.

In order to assemble the hybrid fuel cell system 10, the fuel source 20 is fluidly coupled to the fuel pump 22, and the fuel pump 22 is fluidly coupled to the mixing valve 74 (via the conduit 34) and the start-up valve 36 (via the conduit 32). The start-up valve 36 is fluidly coupled to the steam generator or burner 38 (via the conduit 40) to generate steam. The steam generator or burner 38 is fluidly coupled to the water-gas shift reactor 78 to receive heated water (via the conduit 64). The water from the water-gas shift reactor 78 is circulated in the steam generator or burner 38 via conduit 66 to generate steam, and the steam generator or burner 38 is fluidly coupled to the mixing valve 74 (via the conduit 68). The exhaust of the steam generator or burner 38 is fluidly coupled to the heat exchanger 72 to supply the heat exchanger 72 with heat.

The mixing valve 74 is fluidly coupled to the reformer 76 (via the conduit 80). The reformer 76 is fluidly coupled to the water-gas shift reactor 78 (via the conduit 90), and optionally, fluidly coupled to the air source via air inlet 84. The water-gas shift reactor 78 is fluidly coupled to the water source 130 via the water pump 132 such that water can be circulated through the water-gas shift reactor 78 via the conduit 95. The water-gas shift reactor 78 is also fluidly coupled to the water condenser 104 (via the conduit 102). The water condenser 104 is fluidly coupled to the turbine 108 (via the conduit 106), and fluidly coupled to the water source 130 (via the conduit 138) to enable recirculation or recycling of the water condensed by the water condenser 104. The turbine 108 is coupled to the generator 110, and fluidly coupled to the anode 62 of the fuel cell stack 16.

The blower 118 is fluidly coupled to the water condenser 104 (via the conduit 120) to provide cooled gas for condensing the water in the fuel steam mixture provided into the water condenser 104 by conduit 106. The water condenser 104 is also fluidly coupled to the heat exchanger 72 (via the conduit 124) to provide the cool gas to the heat exchanger 72. The heat exchanger 72 heats the cooled gas, and is fluidly coupled to the cathode 58 of the fuel cell stack 16 to provide the heated gas to the cathode 58 (via the conduit 126).

Upon receipt of a command to start-up the hybrid fuel cell system 10, such as a command received via the user input device 150, the control module 154 outputs the one or more control signals to the start-up valve 36 and the fuel pump 22 to provide fuel from the fuel source 20 to the steam generator or burner 38. The control module 154 also outputs the one or more control signals to the water pump 132 to move water from the water source 130 through the water-gas shift reactor 78 and into the steam generator or burner 38 to generate steam. The control module 154 outputs the one or more controls signals to the combustion source 54 to activate the steam generator or burner 38 to ignite the fuel provided by the fuel source 20 via the start-up valve 36 and the fuel pump 22. By burning the fuel provided via the start-up valve 36 initially, the steam generator or burner 38 starts generating steam from the water supplied by the water pump 132. The initial steam generation is used to bring the hybrid fuel cell system 10 to a desired operating temperature, as required by the particular fuel cell stack 16 employed by the fuel cell system 10. In the example of a PEM fuel cell stack 16, the desired operating temperature ranges from about 80 degrees Celsius (C) to about 100 degrees Celsius (C).

When the steam and the reforming subsystem 26 are heated to a sufficient or desired temperature by the steam generator or burner 38, the control module 154 outputs the one or more control signals to the start-up valve 36 to move the start-up valve 36 from the first, opened position to the second, closed position. The control module 154 also outputs the one or more control signals to the mixing valve 74 to move the mixing valve 74 from the second, closed position to the first, opened position. The control module 154 also outputs the one or more control signals to the motor 122 of the blower 118 to operate the blower 118 to create the gas stream. With the mixing valve 74 in the first, opened position, the fuel from the fuel source 20 mixes with the hot steam from the steam generator or burner 38 and flows into the reformer 76. In the reformer 76, the fuel and steam mixture reacts with the catalysts 88a to convert the fuel into hydrogen ($H_2$), carbon monoxide (CO) and carbon dioxide ($CO_2$). From the reformer 76, the hydrogen enriched gases and steam mixture flows into the water-gas shift reactor 78. The hydrogen enriched gases and steam mixture reacts with the catalysts in the water-gas shift reactor 78 to generate additional hydrogen ($H_2$), resulting in a hydrogen enriched gases and steam mixture exiting the water-gas shift reactor 78.

From the water-gas shift reactor 78, the hydrogen enriched gases and steam mixture flows through the water condenser 104, and the steam in the hydrogen enriched gases and steam mixture is condensed into water. The water condensed by the water condenser 104 flows back to the water source 130, thereby recycling the water employed by the hybrid fuel cell system 10. From the water condenser 104, the hydrogen enriched gases flow into the turbine 108, where the pressure of the hydrogen enriched gases is reduced. By reducing the pressure of the hydrogen enriched gases, the fuel cell stack 16 is operated at an ambient operating pressure. From the turbine 108, the hydrogen enriched gases flow into the anode 62 of the fuel cell stack 16.

The blower 118 creates the gas stream for use by the cathode 58 of the fuel cell stack 16. With the motor 122 of the blower 118 activated, the blower 118 moves or creates the gas stream, which flows through the water condenser 104 to aid in condensing the steam in the hydrogen enriched gases and steam mixture. From the water condenser 104, the gas stream flows into the heat exchanger 72, and the gas stream is heated by the heated exhaust gases of the steam generator or burner 38. From the heat exchanger 72, the heated gas flows into the cathode 58 of the fuel cell stack 16.

The electrochemical reaction between the heated gas at the cathode 58 and the hydrogen enriched gases at the anode 62 generates electrical energy, which is transmitted to the one or more consumers 111. The rotation of the turbine 108 also generates electrical energy via the generator 110, which is also transmitted to the one or more consumers 111. The resultant exhaust gases from the electrochemical reaction at the fuel cell stack 16 flow to the steam generator or burner 38, and the steam generator or burner 38 ignites these gases to aid in generating high temperature steam.

Figure 2:
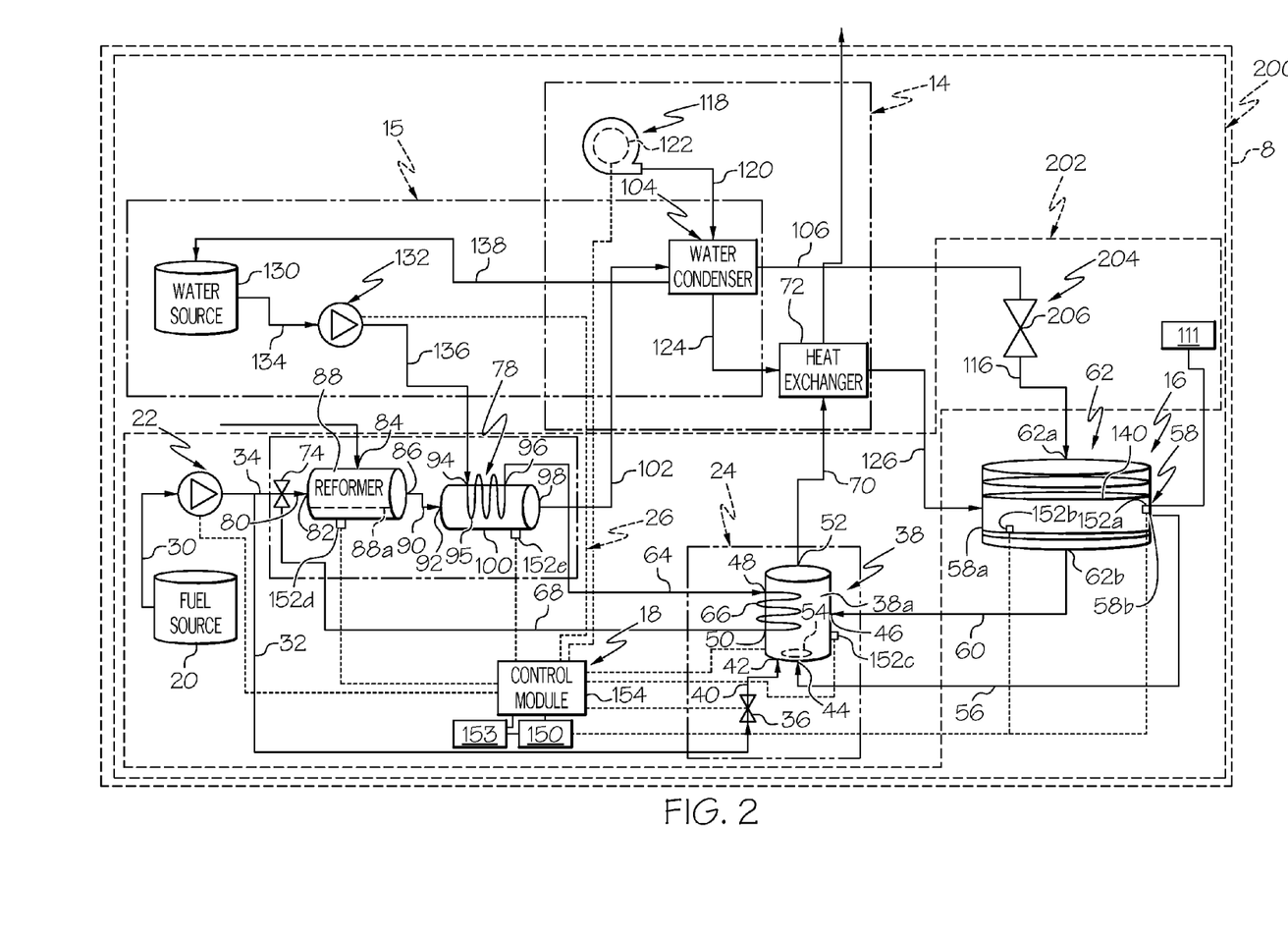
FIG. 2 is a schematic illustration of a hybrid fuel cell system in accordance with various embodiments.

With reference now to FIG. 2, a hybrid fuel cell system 200 is shown. As the hybrid fuel cell system 200 can be similar to the hybrid fuel cell system 10 discussed with regard to FIG. 1, only the differences between the hybrid fuel cell system 10 and the hybrid fuel cell system 200 will be discussed in detail herein, with the same reference numerals used to denote the same or substantially similar components. With reference to FIG. 2, the hybrid fuel cell system 200 includes a fuel supply system 202, the gas supply system 14, the water supply system 15, the fuel cell stack 16 and the control system 18. Although the figures shown herein depict an example with certain arrangements of elements, additional intervening elements, devices, features, or components may be present in an actual embodiment. It should also be understood that FIG. 2 is merely illustrative and may not be drawn to scale.

With continued reference to FIG. 2, the fuel supply system 202 is in fluid communication with the fuel cell stack 16 to provide the fuel cell stack 16 with hydrogen enriched gases. In one example, the fuel supply system 202 includes the fuel source 20, the fuel pump 22, the start-up subsystem 24, the reforming subsystem 26 and a depressurization subsystem 204.

The depressurization subsystem 204 is fluidly coupled to the water condenser 104 of the water supply system 15 and receives the hydrogen enriched gases from the water condenser 104 via the conduit 106. In this example, the depressurization subsystem 204 includes a pressure regulator valve 206. The pressure regulator valve 206 is coupled to and in communication with the conduit 106 to receive the higher pressure hydrogen enriched gases from the water condenser 104. As the pressure regulator valve 206 can comprise a conventional pressure regulator valve known to one skilled in the art, the pressure regulator valve 206 will not be discussed in great detail herein. Briefly, however, the pressure regulator valve 206 reduces the high pressure hydrogen enriched gases to a lower pressure hydrogen enriched gases for use in the fuel cell stack 16. By reducing the pressure of the hydrogen enriched gases, the fuel cell stack 16 is operable at a reduced or ambient pressure. The depressurized or reduced pressure hydrogen enriched gases flow from the pressure regulator valve 206 to the fuel cell stack 16 via the conduit 116. In one example, a pressure ratio of the pressure regulator valve 206 ranges from about 45:1 to about 2:1.

As the hybrid fuel cell system 200 can operate substantially similar to the hybrid fuel cell system 10 discussed above with regard to FIG. 1, the operation of the hybrid fuel cell system 200 will not be discussed in great detail herein. Briefly, however, the pressure regulator valve 206 is in fluid communication with the water condenser 104 (via the conduit 106) to receive the high pressure hydrogen enriched gases, and is in fluid communication with the anode 62 of the fuel cell stack 16 (via the conduit 116) to deliver low pressure hydrogen enriched gases to the fuel cell stack 16. In this regard, the hydrogen enriched gases from the water condenser 104 flows via conduit 106 into the pressure regulator valve 206. The pressure regulator valve 206 reduces the pressure of the hydrogen enriched gases to a lower pressure, and the lower pressure hydrogen enriched gases flows from the pressure regulator valve 206 via the conduit 116 to the anode 62 of the fuel cell stack 16.

Figure 3:
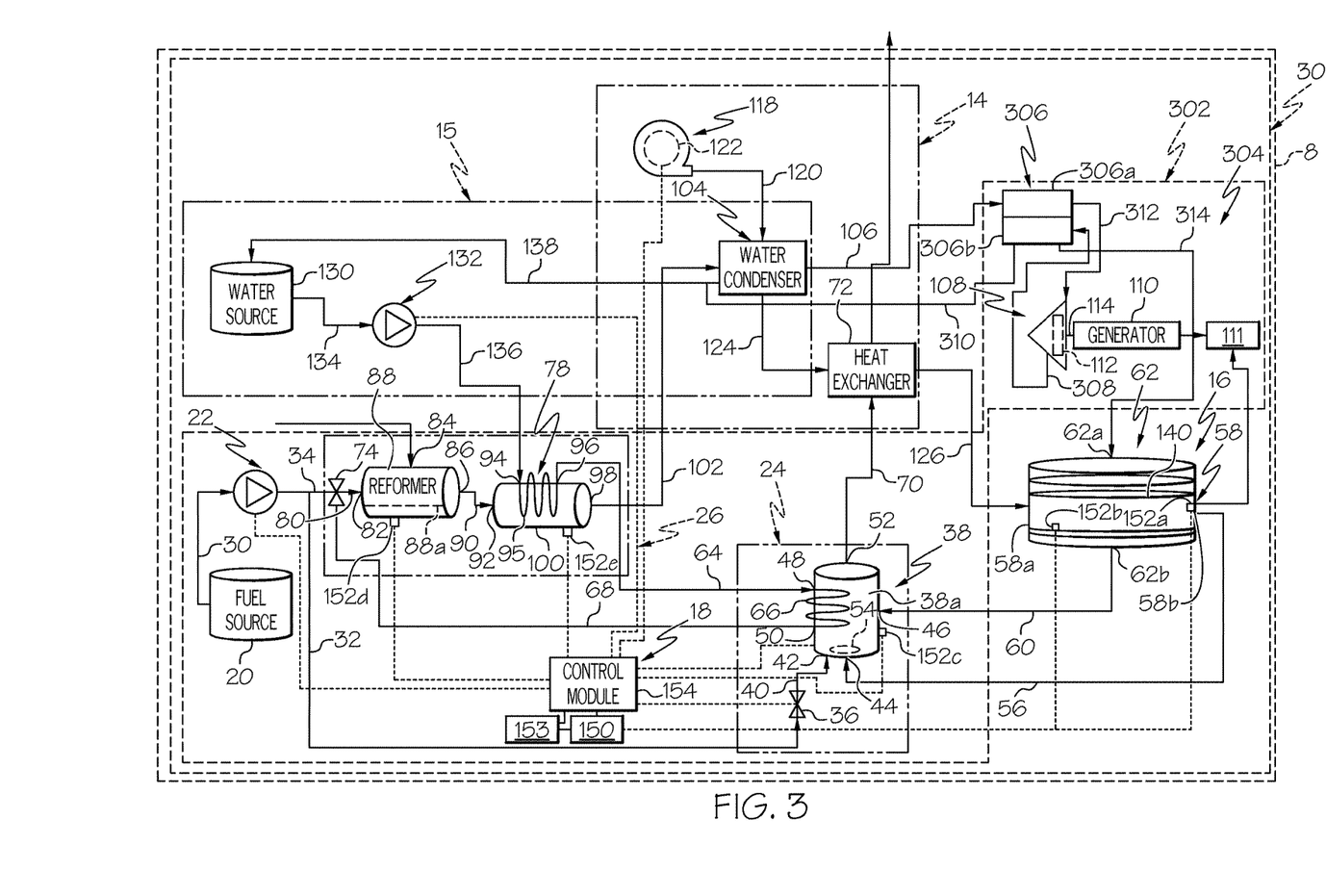
FIG. 3 is a schematic illustration of a hybrid fuel cell system in accordance with various embodiments.

With reference now to FIG. 3, a hybrid fuel cell system 300 is shown. As the hybrid fuel cell system 300 can be similar to the hybrid fuel cell system 10 discussed with regard to FIG. 1, only the differences between the hybrid fuel cell system 10 and the hybrid fuel cell system 300 will be discussed in detail herein, with the same reference numerals used to denote the same or substantially similar components. With reference to FIG. 3, the hybrid fuel cell system 300 includes a fuel supply system 302, the gas supply system 14, the water supply system 15, the fuel cell stack 16 and the control system 18. Although the figures shown herein depict an example with certain arrangements of elements, additional intervening elements, devices, features, or components may be present in an actual embodiment. It should also be understood that FIG. 3 is merely illustrative and may not be drawn to scale.

With continued reference to FIG. 3, the fuel supply system 302 is in fluid communication with the fuel cell stack 16 to provide the fuel cell stack 16 with hydrogen enriched gases. In this example, the fuel supply system 302 includes the fuel source 20, the fuel pump 22, the start-up subsystem 24, the reforming subsystem 26 and a depressurization subsystem 304.

The depressurization subsystem 304 is fluidly coupled to the water condenser 104 and receives the hydrogen enriched gases from the water condenser 104 via the conduit 106. In one example, the depressurization subsystem 304 includes a heat exchanger and water condenser assembly 306, the turbine 108 and the generator 110. The heat exchanger and water condenser assembly 306 includes a heat exchanger 306a and a water condenser 306b operating together to remove additional water from the hydrogen enriched gases provided by the conduit 106. As the heat exchanger 306a and the water condenser 306b can comprise any suitable heat exchanger and water condenser known in the art, the heat exchanger 306a and the water condenser 306b will not be discussed in great detail herein. The heat exchanger and water condenser assembly 306 is in fluid communication with the conduit 106 to receive the hydrogen enriched gases from the water condenser 104, and is in fluid communication with the turbine 108 to receive the lower pressure hydrogen enriched gases via conduit 308. The lower pressure hydrogen enriched gases from the turbine 108 is cooler, and serves to condense additional water from the high pressure hydrogen enriched gases provided by the conduit 106. The high pressure hydrogen enriched gases, after passing through the heat exchanger and water condenser assembly 306 flow into the turbine 108 via conduit 312. The water condenser 306b is in fluid communication with the water source 130 so that the water condensed by the water condenser 306b flows back to the water source 130 via conduit 310. After passing through the water condenser 306b, the lower pressure hydrogen enriched gases flow into the anode 62 of the fuel cell stack 16 via the conduit 116.

As the hybrid fuel cell system 300 can operate substantially similar to the hybrid fuel cell system 10 discussed above with regard to FIG. 1, the operation of the hybrid fuel cell system 300 will not be discussed in great detail herein. Briefly, however, the heat exchanger and water condenser assembly 306 is in fluid communication with the water condenser 104 (via the conduit 106) to receive the high pressure hydrogen enriched gases, and is in fluid communication with the turbine 108 (via the conduit 308 and 314) to receive the low pressure hydrogen enriched gases. The heat exchanger and water condenser assembly 306 is also in fluid communication with the anode 62 of the fuel cell stack 16 (via the conduit 116) to deliver low pressure hydrogen enriched gases to the fuel cell stack 16 and is in fluid communication with the water source 130 (via the conduit 310, 138) to provide condensed water to the water source 130.

The high pressure hydrogen enriched gases from the water condenser 104 flows via conduit 106 into the heat exchanger and water condenser assembly 306. The heat exchanger and water condenser assembly 306 uses the lower pressure hydrogen enriched gases from the turbine 108 to condense water from the higher pressure hydrogen enriched gases, and the condensed water is recycled back to the water source 130. After passing through the heat exchanger and water condenser assembly 306, the high pressure hydrogen enriched gases flow through the turbine 108, which reduces the pressure of the hydrogen enriched gases to a lower pressure, and the lower pressure hydrogen enriched gases flow from the turbine 108 via the conduit 308 to the heat exchanger and water condenser assembly 306. From the heat exchanger and water condenser assembly 306, the lower pressure hydrogen enriched gases flow into the anode 62 of the fuel cell stack 16 via the conduit 116.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hybrid fuel cell system comprising:
a fuel supply system including a fuel tank including a combustible fuel, a start-up subsystem, a reforming subsystem and a depressurization system, the fuel tank in selective fluid communication with the start-up subsystem and the reforming subsystem, the start-up subsystem including a steam generator downstream from the fuel tank that receives the fuel from the fuel tank based on a start-up command for the fuel cell system and uses the fuel to generate steam to raise an operating temperature of the reforming subsystem, and based on the operating temperature of the reforming subsystem, the reforming subsystem receives the fuel from the fuel tank and reforms the fuel from the fuel tank to generate a hydrogen enriched gases and steam mixture;

a gas supply system that provides a gas stream;
a water supply system having a source of water that provides water for the steam generator, the water supply system including a water condenser directly downstream from the reforming subsystem that is in fluid communication with the gas stream and the hydrogen enriched gases and steam mixture, the water condenser condenses the hydrogen enriched gases and steam mixture into water and hydrogen enriched gases, the water condensed by the water condenser is communicated back to the source of water and the depressurization system is downstream from the water condenser and in fluid communication with the water condenser to receive the hydrogen enriched gases, the depressurization system reduces a pressure of the hydrogen enriched gases; and
a fuel cell stack downstream from the depressurization system and having an anode inlet in fluid communication with the depressurization system to receive the hydrogen enriched gases at the reduced pressure and a cathode inlet in fluid communication with the gas supply system.

2. The hybrid fuel cell system of claim 1, wherein the depressurization system includes a turbine downstream from the water condenser that receives the hydrogen enriched gases and reduces the pressure of the hydrogen enriched gases.

3. The hybrid fuel cell system of claim 2, wherein the depressurization system includes a generator coupled to the turbine that generates electrical energy as the turbine reduces the pressure of the hydrogen enriched gases.

4. The hybrid fuel cell system of claim 1, wherein the depressurization system includes a pressure regulator valve downstream from the water condenser that receives the hydrogen enriched gases and reduces the pressure of the hydrogen enriched gases.

5. The hybrid fuel cell system of claim 2, wherein the depressurization system includes a heat exchanger and a water condenser assembly downstream from the water condenser that receives the hydrogen enriched gases, the hydrogen enriched gases at the reduced pressure from the turbine and condenses water in the hydrogen enriched gases with the hydrogen enriched gases at the reduced pressure.

6. The hybrid fuel cell system of claim 1, further comprising a heat exchanger upstream from the fuel cell stack that heats the gas from the gas supply system, the heat exchanger downstream from the steam generator and upstream from the fuel cell stack, and the heat exchanger receives an exhaust gas from the steam generator to heat the gas from the gas supply system before the gas flows into the fuel cell stack.

7. The hybrid fuel cell system of claim 1, wherein the reforming subsystem further comprises:
a reformer in fluid communication with the fuel tank and a source of steam; and
a water-gas shift reactor downstream from the reformer to receive a hydrogen enriched gases and steam mixture from the reformer.

8. The hybrid fuel cell system of claim 1, wherein the steam generator is downstream from the fuel cell stack to combust one or more exhaust gases from the fuel cell stack.

9. A hybrid fuel cell system comprising: a fuel supply system including a fuel tank including a combustible fuel, a start-up subsystem, a reforming subsystem and a depressurization system, the fuel tank in selective fluid communication with the start-up subsystem and the reforming subsystem, the start-up subsystem including a steam generator that combusts the fuel from the fuel tank and a source of water, the steam generator downstream from the fuel tank that receives the fuel from the fuel tank based on a start-up command for the fuel cell system and combusts the fuel to heat the water and generate steam to raise an operating temperature of the reforming subsystem, the reforming subsystem in fluid communication with the start-up subsystem to receive the steam and the reforming subsystem reforms the fuel from the fuel tank with the steam to generate a hydrogen enriched gases and steam mixture, and the depressurization system receives the hydrogen enriched gases and reduces a pressure of the hydrogen enriched gases;
a gas supply system that provides a gas stream; a water supply system having the source of water that provides the water for the steam generator, the water supply system including a water condenser directly downstream from the reforming subsystem that is in fluid communication with the gas stream and the hydrogen enriched gases and steam mixture, the water condenser condenses the hydrogen enriched gases and steam mixture into water and hydrogen enriched gases, the water condensed by the water condenser is communicated back to the source of water and the depressurization system is downstream from the water condenser and in fluid communication with the water condenser to receive the hydrogen enriched gases; and a fuel cell stack downstream from the depressurization system and having an anode inlet in fluid communication with the depressurization system to receive the hydrogen enriched gases at the reduced pressure and a cathode inlet in fluid communication with the gas supply system, the fuel cell stack upstream from the steam generator.

10. The hybrid fuel cell system of claim 9, wherein the depressurization system includes a turbine downstream from the water condenser that receives the hydrogen enriched gases and reduces the pressure of the hydrogen enriched gases.

11. The hybrid fuel cell system of claim 9, wherein the depressurization system includes a pressure regulator valve downstream from the water condenser that receives the hydrogen enriched gases and reduces the pressure of the hydrogen enriched gases.

12. The hybrid fuel cell system of claim 10, wherein the depressurization system includes a heat exchanger and a water condenser assembly downstream from the water condenser that receives the hydrogen enriched gases, the hydrogen enriched gases at the reduced pressure from the turbine and condenses water in the hydrogen enriched gases with the hydrogen enriched gases at the reduced pressure.

13. The hybrid fuel cell system of claim 9, wherein the reforming subsystem further comprises:
a reformer in fluid communication with the fuel source and the steam; and
a water-gas shift reactor downstream from the reformer to receive a hydrogen enriched gases and steam mixture from the reformer.

14. A hybrid fuel cell system comprising:
a gas supply system that provides a gas stream;
a fuel supply system including a fuel tank including a combustible fuel, a start-up subsystem, a reforming subsystem and a depressurization system including a turbine, the fuel tank in selective fluid communication with the start-up subsystem and the reforming subsystem, the start-up subsystem including a steam generator that combusts the fuel from the fuel tank and a source of water, the steam generator downstream from the fuel tank that receives the fuel from the fuel tank based on a start-up command for the fuel cell system and combusts the fuel to heat the water and generate steam and an exhaust gas, the reforming subsystem in fluid communication with the start-up subsystem to receive the steam and the reforming subsystem reforms the fuel from the fuel tank with the steam to generate a hydrogen enriched gases and steam mixture, and the turbine receives hydrogen enriched gases and reduces a pressure of the hydrogen enriched gases;

a water supply system having the source of water that provides the water for the steam generator, the water supply system including a water condenser directly downstream from the reforming subsystem that is in fluid communication with the gas stream and the hydrogen enriched gases and steam mixture, the water condenser condenses the hydrogen enriched gases and steam mixture into water and hydrogen enriched gases, the water condensed by the water condenser is communicated back to the source of water and the turbine is downstream from the water condenser and in fluid communication with the water condenser to receive the hydrogen enriched gases;

a fuel cell stack downstream from the turbine and having an anode inlet in fluid communication with the turbine to receive the hydrogen enriched gases at the reduced pressure, and a cathode inlet in fluid communication with the gas supply system to receive the gas stream, the steam generator downstream from the fuel cell stack to combust one or more exhaust gases from the fuel cell stack; and a heat exchanger downstream from the steam generator and upstream from the fuel cell stack that receives the exhaust gas from the steam generator and heats the gas stream from the gas supply system before the gas stream flows into the fuel cell stack.

* * * * *